United States Patent [19]

Kühnel et al.

[11] 4,387,170

[45] Jun. 7, 1983

[54] PROCESS FOR THE PRODUCTION OF FOAMED MATERIALS FROM POLYOLEFINS

[75] Inventors: Werner Kühnel, Neunkirchen-Schöneshof; Paul Spielau, Troisdorf-Eschmar, both of Fed. Rep. of Germany

[73] Assignee: Dynamit Nobel AG, Kroisdorf, Fed. Rep. of Germany

[21] Appl. No.: 273,710

[22] Filed: Jun. 15, 1981

Related U.S. Application Data

[63] Continuation of Ser. No. 87,845, Oct. 20, 1979, abandoned.

[30] Foreign Application Priority Data

Oct. 26, 1978 [DE] Fed. Rep. of Germany ....... 2846646

[51] Int. Cl.$^3$ .............................................. C08J 9/06
[52] U.S. Cl. ............................... 521/85; 264/DIG. 5; 521/88; 521/96; 521/143; 521/909; 521/910
[58] Field of Search .................... 521/85, 88, 96, 143, 521/909, 910

[56] References Cited

U.S. PATENT DOCUMENTS

| | | | |
|---|---|---|---|
| 3,098,831 | 7/1963 | Carr | 264/DIG. 18 |
| 3,098,832 | 7/1963 | Pooley et al. | 264/DIG. 18 |
| 3,278,466 | 10/1966 | Cram et al. | 521/910 |
| 3,468,821 | 9/1969 | Behrendsen | 521/910 |
| 3,645,929 | 2/1972 | Normanton | 521/128 |
| 3,966,651 | 6/1976 | Kleiner et al. | 521/910 |
| 4,203,815 | 5/1980 | Noda et al. | 521/79 |

*Primary Examiner*—Morton Foelak
*Attorney, Agent, or Firm*—Sprung, Horn, Kramer & Woods

[57] ABSTRACT

An improved process for the foaming of polyolefin materials is disclosed where the polyolefin is crosslinked by a peroxide and foamed by a chemical foaming agent combined with an auxiliary foaming agent is disclosed. According to the invention, the auxiliary foaming is a sterically hindered phenol and/or an organic phosphorus compound.

6 Claims, No Drawings

PROCESS FOR THE PRODUCTION OF FOAMED MATERIALS FROM POLYOLEFINS

This is a continuation of application Ser. No. 087,845, filed Oct. 20, 1979 abandoned.

The object of the invention is a process for the production of foamed materials from polyolefins by peroxide crosslinking and foaming with a chemical foaming agent with the addition of an auxiliary foaming agent.

It is known to mix polyolefins with organic peroxides and foaming agents. The polyolefins may be mixed with the crosslinking and foaming agents and, optionally, with conventional additives in a roll mill or an extruder, followed by production of the shaped articles, such as plates or continuous sheets, below the temperature of decomposition of the peroxide. The polyolefin then is crosslinked below the decomposition point of the foaming agent by decomposition of the crosslinking agent. The temperature then is raised to the decomposition range of the foaming agent and the polyolefin is foamed by the gases so generated. The foaming agent preferably used for foaming is azodicarbonamide. The product is a polyolefin foam having a relatively high density and an irregular surface. See U.S. Pat. No. 3,098,831 and German Auslegesschrift DAS No. 1,694,130.

In principle, the density of the foam can be regulated by variation of the amount of foaming agent used. This does not, however, yield a foamed plastic which at the same time has a smooth surface.

To increase the gas yield, it is known from German Pat. No. 1,936,098 to add to the foaming agent, azodicarbonamide from 0.05 to 10 weight percent of a chromium compound as an auxiliary foaming agent. However, to obtain an appreciable increase in gas yield, and hence a reduction of the bulk density of the foamed plastic, relatively large amounts of chromium compound are required, and this has proven a drawback in several respects. The foamed plastics undergo discoloration, the foam structure is non-uniform, and the surface is irregular.

The present invention has as its object to provide a uniform foamed material with a good surface finish and low bulk density.

In accordance with the invention, this object is accomplished by adding to the polyolefin, in addition to the peroxide and the foaming agent and, optionally, other auxiliary agents, a sterically hindered phenol and/or an organic phosphorus compound as auxiliary foaming agent.

In carrying out the process of the invention, the polyolefins may be mixed with the crosslinking agents, foaming agents and, optionally, conventional additives, and with the auxiliary foaming agents used in accordance with the invention in a roll mill or an extruder, followed by production of the shaped articles, such as plates or continuous sheets, at temperatures below the decomposition point of the peroxide. The average retention time in the mixing means is chosen so that essentially no crosslinking of the mixture to be foamed occurs at this stage. Crosslinking of the polyolefin then takes place below the decomposition point of the foaming agent through decomposition of the crosslinking agent accompanied by an increase in the melting viscosity of the polyolefin. As the temperature is raised further to the decomposition temperature of the foaming agent, the shaped articles is foamed. Depending on the amount of foaming agent, auxiliary foaming agent and crosslinking agent used and on the operating conditions, the resulting foam will have a bulk density between 15 and 300 kg/m$^3$, and preferably between 20 and 200 kg/m$^3$.

The process in accordance with the invention is preferably used to manufacture continuous foamed-material sheets, for example, by the method described in German Auslegeschrift No. 1,694,130.

The foaming agent used is preferably one which liberates gas at elevated temperatures and whose decomposition temperature is higher than that of the organic peroxide used. Suitable foaming agents are, for example, azodicarbonamide and/or p,p'-oxybis benzenesulfonyl hydrazide and/or dinitrosopentamethylenetetramine and the like.

The foaming agent preferably used in conjunction with the auxiliary foaming agent in accordance with the invention is azodicarbonamide, with a decomposition point or range starting at about 190° C. The amount of foaming agent to be used depends on the desired bulk density of the foamed material to be produced and usually ranges from 0.5 to 25 weight percent, and preferably from 1 to 20 weight percent, based on the total mixture to be formed into a shaped article.

The substances which in accordance with the invention are employed as auxiliary foaming agents are generally used in an amount ranging from 0.05 to 3 weight percent, based on the polyolefin used. Surprisingly, they have the effect of reducing the density of the foamed material. The addition of the auxiliary foaming agent in accordance with the invention to the mixture to be foamed makes it possible to obtain a reduction of the bulk density, essentially determined by the amount of foaming agent used, of up to 20 percent, and occasionally of over 20 percent. Surprisingly, too, the foam so produced has a smooth surface as well.

Through the auxiliary foaming agent employed in accordance with the invention, the gas yield of the foaming agent is evidently increased. One can, in principle, select the desired bulk density of the foamed material while using smaller amounts of foaming agent.

Depending on the polyolefin composition, 2,5-dimethyl-2,5-di(tert. butylperoxy)hexane, tert, butylhydroperoxide, cumyl tert, butyl peroxide or di-tert. butyl peroxide, and perferably dicumyl peroxide, may be used as organic peroxide. The peroxides are used in amounts ranging from 0.3 to 1.5 weight percent, based on the polyolefin.

Suitable for use as polyolefins are polyethylene or polypropylene, optionally also mixtures thereof, although polyethylene, and more particularly low-pressure polyethylene of a density of from 0.94 to 0.97 g/cm$^3$ and/or high-pressure polyethylene of a density of form 0.91 to about 0.94 g/cm$^3$, is preferred, high-pressure polyethylene being particularly preferred. However, the term "polyolefins" is intended to include also copolymers, and preferably copolymers produced from monomeric mixtures composed predominantly of ethylene, as well as mixtures thereof with homopolymers. Such copolymers include, for example, ethylene-propylene copolymers, ethylene-butylene copolymers, copolymers of ethylene and vinyl acetate and its derivatives, copolymers of ethylene and acrylic acid esters or their derivatives, copolymers of ethylene and methacrylic acid or its derivatives, and the like. Mixtures of said polyolefins and rubber and/or plastics may also be processed into foamed materials in accordance with the invention. These include mixtures composed to the extent of 50 weight percent and over of polyolefins.

Rubbers miscible with polyolefins are natural rubber, ethylene-propylene rubber, butyl rubber, polyisobutylene, ABS rubber, polybutadiene, polybutene and polyisoprene, for example. Plastics miscible with polyolefins are, for example, polystyrene, chlorinated polyethylene, sulfochlorinated polyethylene or the like.

Conventional additives commonly used with polyolefin-based plastics include light stabilizers, pigments, fillers, flame retardants, antistatic agents, lubricants, etc., which may be added to the mixture to be crosslinked and foamed before it is processed into a shaped article.

In the preferred use of the auxiliary foaming agent according to the invention in combination with azodicarbonamide, crosslinking occurs from about 160° C., and foaming at temperatures from about 190° C. to about 250° C., and preferably to about 220° C.

Suitable sterically hindered phenols and/or phosphorus compounds are primarily those whose melting points are above room temperature but below foaming temperature. Generally, the melting points are in the range of from about 40° to about 170° C.

Sterically hindered phenols with from one to four phenolically bound OH groups in which the phenolic structural units are monohydric have provden suited for the purposes of the invention.

Suited are, specifically:

| | |
|---|---|
| Pentaerythrityl tetrakis[3-(3,5-di-tert. butyl-4-hydroxyphenyl)propionate] | (I) |
| Octadecyl-3-(3,5-di-tert. butyl-4-hydroxyphenyl)propionate | (II) |
| 2,2'-methylene-bis(4-methyl-6-tert. butylphenol) | (III) |
| 2,2'-methylene-bis(4-ethyl-6-tert. butylphenol) | (IV) |
| 2,6'-di-(2'-hydroxy-3-tert. butyl-5'-methylbenzyl)-4-methylphenol) | (V) |
| 2,6-di-tert. butyl-4-methylphenol | (VI) |
| 2-methyl-6-tert. butylphenol | (VII) |
| 2,6-diisopropylphenol | (VIII) |
| 2,2-bis(4-hydroxyphenyl)propane | (IX) |

Sterically hindered phenols include those derived from phosphonic acid or phosphonic acid dialkyl esters, among them 3,5-di-tert. butyl-4-hydroxybenzylphosphonic acid diethyl ester, for example, and the corresponding dimethyl ester.

Also suited are sterically hindered phenols containing —S— groups as links including polynuclear phenols joined to one another through a sulfur bridge or a sulfur containing bridge such as 4,4'-thio-bis(3-methyl-6-tert. butylphenol) and 2,2'-thiodiethylbis[3-(3,5-di-tert. butyl-4-hydroxyphenyl)propionate].

Particularly well suited are the phenolic compounds I to V to IX. Suited among the organic phosphorus compounds are, apart from the mentioned phosphonic acid derivatives, those derived from diphosphonites, and particularly from biphenylene diphosphonites, for example, tetrakis-(2-4-di-tert. butylphenyl)-4,4'-biphenylene diphosphonite.

The auxiliary foaming agents may be added to the mixture to be foamed either alone or in mixture with the foaming agent or, optionally, in the form of a concentrate in a polyolefin.

The foamed materials produced in accordance with the invention find application in the construction industry as insulating materials providing improved heat insulation because of their smooth surface and low bulk density, in the packaging industry, and as facings for floors, ceilings and walls, where their low bulk density and smooth surface are also an advantage.

The examples which follow will serve to illustrate the invention.

The melt index was determined in conformity with DIN 53,735 (190° C./2.15 kg). The high-pressure polyethylene used had a melt index of 4 g/10 min. and a density of 0.92 g/cm³.

The ethylene-vinyl acetate copolymer (weight ratio, 92:8) had a melt index of 5 g/10 min., determined in conformity with DIN 53,735 (190° C./2.15 kg).

The low-pressure polyethylene had a melt index of 18 g/10 min., determined as above. The density was 0.95.

In order to more fully illustrate the nature of the invention and the manner of practicing the same, the following examples are presented:

As sterically hindered phenols are understood such phenols with one OH group in one or more aromatic rings, preferably benzene rings, per molecule, wherein said phenolic OH group has in both directly lateral positions substituents, with are either a tertiary group as the group —C(CH₃)₃ or a group —CH₂—, forming a connection to a further aromatic ring, preferrably a benzene ring, further substituents in the molecule may be chosen as wanted. Of sterically hinderance is been spoken, when normal chemical reactions of the phenolic group do not occur or occur only at considerable higher temperatures or in longer times as in case of, for example, phenol itself.

Thus in some cases can be seen, that sterical hinderance is effected by other than directly lateral groups, if they are very long, very often branched or being a further group

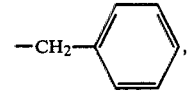

thus the group OH being situated in a hollow, formed by said sterically hindering groups.

Thus further substances, effective as auxiliary foaming agent are such sterically hindered phenols, containing one or more groups

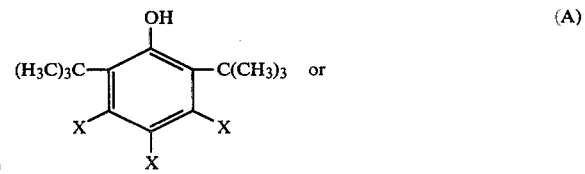

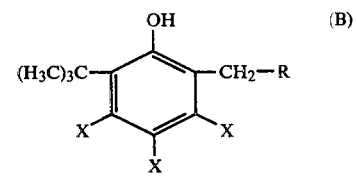

wherein X is H, lower straight chain or branched alkyl of 1 to 26 C-atoms, the group —$(CH_2)_n$—COO—X, wherein n is 1 to 4, and R means a residue of A, bond at one X position, said residue of A in case being substituted by a further residue A or a residue B, which is bond on R position. Further substances analogous to B are such, having an acetylate group instead of a propionate group. In similar manner further phosphonic acid alkyl esters are such of the formula

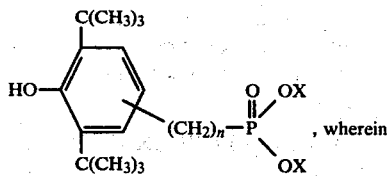, wherein n and X have the meaning given before.

Generally usable diphosphonits are of the formula

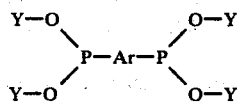

wherein Ar is

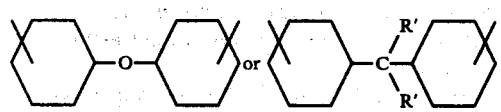

wherein R' is H or —$CH_3$ and Y means a residue of I bond on X position or

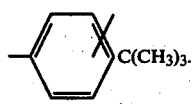

Sterically hindered phenols containing —S— groups generally are of the formula

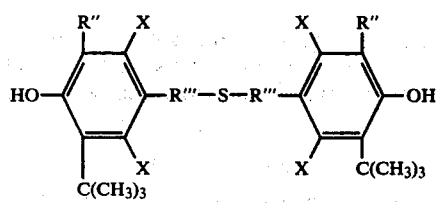

wherein R'' is H, $CH_3$ or preferably —$C(CH_3)_3$, X is H or alkyl of 1 to 4 C-Atoms, R''' being a pair of bonding electrons or the group

and m being 1 or 2.

In all sterically hindered phenols in some cases instead of two directly lateral substituents —$C(CH_3)_3$ may be present one, or the other position being bond then H or lower alkyl as defined.

COMPARATIVE EXAMPLE 1

84 parts by weight high-pressure polyethylene,
1 part by weight dicumyl peroxide and
15 parts by weight azodicarbonamide were compounded in a roll mill at a roll surface temperature of 110° C. for a milling time of 20 min. The material was then taken off the rolls as a sheet and pressed in a press of 130° C. and a retention time of 8 min. into a 4-mm-thick smooth-surfaced plate. Specimens 8 cm in diameter were then cut from the plate and foamed at 210° C. in a drying cabinet to give foamed articles of a thickness of 13.5 mm and a bulk density of 30 kg/m$^3$. The bulk density of the foam is determined by the formulation.

EXAMPLE 1

84 parts by weight high-pressure polyethylene (as in comparative example 1),
1 part by weight dicumyl peroxide,
15 parts by weight azodicarbonamide, and
0.3 part by weight of the auxiliary foaming agent 2,2'-methylene-bis(4-methyl-6-tert. butylphenol) in accordance with the invention (molecular weight 341).

The processing procedure and conditions were the same as in comparative example 1. A foam of a thickness of 15.5 mm and a bulk density of 28 kg/m$^3$ was obtained.

EXAMPLE 2

84 parts by weight high-pressure polyethylene (as in comparative example 1),
1 part by weight dicumyl peroxide
15 parts by weight azodicarbonamide, and
0.3 part by weight of the auxiliary foaming agent pentaerythrityl tetrakis[3-(3,5-di-tert. butyl-4-hydroxyphenyl)-propionate] (molecular weight 1178).

The processing procedure and conditions were the same as in comparative example 1. A foam of a thickness of 15 mm and a bulk density of 27 kg/m$^3$ was obtained.

COMPARATIVE EXAMPLE 2

84.2 parts by weight of the ethylene-vinyl acetate copolymer mentioned above,
0.8 part by weight of dicumyl peroxide, and
15 parts by weight of azodicarbonamide.

The processing procedure and conditions were the same as in example 1. A foam of a thickness of 14 mm and a bulk density of 30 kg/m$^3$ was obtained.

EXAMPLE 3

84.2 parts by weight of the copolymer of comparative example 2,
0.8 part by weight dicumyl peroxide,
15 parts by weight azodicarbonamide, and
0.3 part by weight of the auxiliary foaming agent of example 1 (molecular weight 341).

The processing procedure and conditions were the same as in comparative example 1. A foam of a thickness of 14.5 mm and a bulk density of 28 kg/m$^3$ was obtained.

EXAMPLE 4

84.2 parts by weight of the copolymer of comparative example 2,
0.8 part by weight dicumyl peroxide,
15 parts by weight azodicarbonamide, and
0.3 part by weight of the auxiliary foaming agent of example 2 (molecular weight 1178).

The processing procedure and conditions were the same as in comparative example 1. A foam of a thickness of 15 mm and a bulk density of 28 kg/m$^3$ was obtained.

COMPARATIVE EXAMPLE 3

79 parts by weight of the copolymer of comparative example 2,
0.6 part by weight dicumyl peroxide, and
20.4 parts by weight azodicarbonamide.

The processing procedure and conditions were the same as in comparative example 1. A foam of a thickness of 14.5 mm and a bulk density of 25 kg/m$^3$ was obtained.

EXAMPLE 5

79 parts by weight of the copolymer of comparative example 2,
0.6 part by weight dicumyl peroxide,
20.4 parts by weight azodicarbonamide, and
0.3 part by weight of the auxiliary foaming agent octadecyl-3-(3,5-di-tert. butyl-4-hydroxyphenyl)propionate (molecular weight 531).

The processing procedure and conditions were the same as in comparative example 1. A foam of a thickness of 16.5 mm and a bulk density of 19 kg/m$^3$ was obtained.

COMPARATIVE EXAMPLE 4

89 parts by weight high-pressure polyethylene as in comparative example 1,
1 part by weight dicumyl peroxide, and
10 parts by weight azodicarbonamide.

The processing procedure and conditions were the same as in comparative example 1. A foam of a thickness of 13 mm and a bulk density of 50 kg/m$^3$ was obtained.

EXAMPLE 6

89 parts by weight high-pressure polyethylene as in comparative example 1,
1 part by weight dicumyl peroxide,
10 parts by weight azodicarbonamide, and
0.8 part by weight of the auxiliary foaming agent of example 2 (molecular weight 1178).

The processing procedure and conditions were the same as in comparative example 1. A foam of a thickness of 14 mm and a bulk density of 43 kg/cm$^3$ was obtained.

COMPARATIVE EXAMPLE 5

67 parts by weight high-pressure polyethylene as in comparative example 1,
17 parts by weight low-pressure polyethylene,
1 part by weight dicumyl peroxide, and
15 parts by weight azodicarbonamide.

The processing procedure and conditions were the same as in comparative example 1. A foam of a thickness of 13.6 mm and a bulk density of 32 kg/m$^3$ was obtained.

EXAMPLE 7

67 parts by weight high-pressure polyethylene as in comparative example 5,
17 parts by weight low-pressure polyethylene as in comparative example 5,
1 part by weight dicumyl peroxide,
15 parts by weight azodicarbonamide, and
0.3 part by weight of the auxiliary foaming agent (molecular weight 341).

The processing procedure and conditions were the same as in comparative example 1. A foam of a thickness of 15.5 mm and a bulk density of 27 kg/m$^3$ was obtained.

COMPARATIVE EXAMPLE 6

84 parts by weight high-pressure polyethylene as in comparative example 1,
1 part by weight dicumyl peroxide,
15 parts by weight azodicarbonamide, and
3 parts by weight of a blue dye concentrate commercially available under the trade name Sicoversal ® Blue 23075.

The processing procedure and conditions were the same as in comparative example 1. A foam of a thickness of 12 mm and a bulk density of 36 kg/m$^3$ was obtained.

EXAMPLE 8

84 parts by weight high-pressure polyethylene as in comparative example 1,
1 part by weight dicumyl peroxide,
15 parts by weight azodicarbonamide,
3 parts by weight dye concentrate as in comparative example 6,
1 part by weight auxiliary foaming agent as in example 1 (molecular weight 341).

The processing procedure and conditions were the same as in comparative example 1. A foam of a thickness of 14 mm and a bulk density of 30 kg/m$^3$ was obtained.

EXAMPLE 9

84 parts by weight high-pressure polyethylene,
1 part by weight dicumyl peroxide,
15 parts by weight azodicarbonamide, and
0.8 part by weight tetrakis-(2,4-di-tert. butylphenyl)-4,4'-biphenylene diphosphonite (molecular weight 1034).

The processing procedure and conditions were the same as in comparative example 1. A foam of a thickness of 15 mm and a bulk density of 27 kg/m$^3$ was obtained.

EXAMPLE 10

84 parts by weight high-pressure polyethylene as in comparative example 1,
1 part by weight dicumyl peroxide,
15 parts by weight azodicarbonamide, and
0.5 part by weight of the auxiliary foaming agent of example 2.

The processing procedure and conditions were the same as in comparative example 1. A foam of a thickness of 15.5 mm and a bulk density of 25 kg/m$^3$ was obtained.

COMPARATIVE EXAMPLE 7

94.9 parts by weight high-pressure polyethylene as in comparative example 1, 1.1 parts by weight dicumyl peroxide, and 4 parts by weight azodicarbonamide.

The processing procedure and conditions were the same as in comparative example 1. A foam of a thickness of 9.5 mm and a bulk density of 115 kg/m$^3$ was obtained.

EXAMPLE 11

94.9 parts by weight high-pressure polyethylene as in comparative example 1, 1.1 parts by weight dicumyl peroxide, 4 parts by weight azodicarbonamide, and 2 parts by weight auxiliary foaming agent as in example 2.

The processing procedure and conditions were the same as in comparative example 1. A foam of a thickness of 11 mm and a bulk density of 90 kg/m$^3$ was obtained.

The foamed-material specimens of comparative examples 1 to 7 were found to have a very rough and irregular surface whereas the test pieces produced in examples 1 to 11 according to the invention exhibited a smooth, uniform surface.

The examples show clearly that the use of the auxiliary foaming agents in accordance with the invention results in a substantial reduction of the bulk density.

What is claimed is:

1. In a process for the production of a foamed material from polyolefin by organic peroxide crosslinking and foaming by means of a chemical foaming agent with a decomposition point or range starting at about 190° C. and an auxiliary foaming agent, the improvement wherein said polyolefin is foamed employing as said auxiliary foaming agent a sterically hindered phenol or an organic phosphorus compound.

2. A process according to claim 1 wherein said auxiliary foaming agent is a sterically hindered phenol and said sterically hindered phenol contains from 1 to 4 phenolically bound OH groups, the phenolic structural units being monohydric.

3. A process according to claim 1 wherein the auxiliary foaming agent is an organic phosphorus compound and said organic phosphorus compound is a diphosphonite.

4. A process according to claim 3 wherein said diphosphonite is 4,4'-biphenylene diphosphonite.

5. A process according to claim 1 wherein said sterically hindered phenol and/or said organic phosphorus compound is employed in an amount ranging from 0.05 to 3 weight percent, based upon the amount of polyolefin employed.

6. A process according to claim 1 wherein the chemically foaming agent has a decomposition point of about 190° C.

* * * * *